US010619271B2

(12) United States Patent
Buytaert et al.

(10) Patent No.: US 10,619,271 B2
(45) Date of Patent: Apr. 14, 2020

(54) PROCESS FOR MANUFACTURING AN ELONGATED STEEL ELEMENT TO REINFORCE RUBBER PRODUCTS

(71) Applicant: NV BEKAERT SA, Zwevegem (BE)

(72) Inventors: Guy Buytaert, Sint-Gillis-Waas (BE); Dieter Wemel, Ghent (BE); Patricia Reis, Vespasiano (BR)

(73) Assignee: NV BEKAERT SA, Zwevegem (BE)

(*) Notice: Subject to any disclaimer, the term of this patent is extended or adjusted under 35 U.S.C. 154(b) by 55 days.

(21) Appl. No.: 15/952,636

(22) Filed: Apr. 13, 2018

(65) Prior Publication Data
US 2018/0230625 A1 Aug. 16, 2018

Related U.S. Application Data

(62) Division of application No. 14/375,295, filed as application No. PCT/EP2012/064475 on Jul. 24, 2012, now abandoned.

(30) Foreign Application Priority Data

Feb. 6, 2012 (EP) .................................... 12154051

(51) Int. Cl.
D02G 3/48 (2006.01)
C25D 7/06 (2006.01)
C25D 5/48 (2006.01)
C25D 5/10 (2006.01)
C25D 5/50 (2006.01)
D07B 1/06 (2006.01)
C22C 9/04 (2006.01)
B32B 15/01 (2006.01)
C22C 38/00 (2006.01)
C22C 38/02 (2006.01)
C22C 38/04 (2006.01)
C22C 38/42 (2006.01)
C22C 38/44 (2006.01)
C09D 7/61 (2018.01)
C09D 5/38 (2006.01)
B21C 1/02 (2006.01)
B60C 9/00 (2006.01)
C08K 3/08 (2006.01)
C25D 3/12 (2006.01)
C25D 3/22 (2006.01)
C25D 3/38 (2006.01)

(52) U.S. Cl.
CPC ................ D02G 3/48 (2013.01); B21C 1/02 (2013.01); B32B 15/015 (2013.01); B60C 9/0007 (2013.01); C08K 3/08 (2013.01); C09D 5/38 (2013.01); C09D 7/61 (2018.01); C22C 9/04 (2013.01); C22C 38/00 (2013.01); C22C 38/001 (2013.01); C22C 38/02 (2013.01); C22C 38/04 (2013.01); C22C 38/42 (2013.01); C22C 38/44 (2013.01); C25D 5/10 (2013.01); C25D 5/48 (2013.01); C25D 5/50 (2013.01); C25D 7/06 (2013.01); C25D 7/0607 (2013.01); D07B 1/0666 (2013.01); B60C 2009/0014 (2013.01); C25D 3/12 (2013.01); C25D 3/22 (2013.01); C25D 3/38 (2013.01); D07B 1/066 (2013.01); D07B 2201/2011 (2013.01); D07B 2201/2043 (2013.01); D07B 2205/3089 (2013.01); D07B 2501/2046 (2013.01)

(58) Field of Classification Search
None
See application file for complete search history.

(56) References Cited

U.S. PATENT DOCUMENTS

| 2,240,805 | A | 5/1941 | Semon |
| 2,500,810 | A | 3/1950 | Fink |
| 2,792,868 | A | 5/1957 | Benson |
| 3,391,531 | A | 7/1968 | Riggs |
| 3,846,160 | A | 11/1974 | Hirakawa |
| 3,961,740 | A | 6/1976 | Nakamoto et al. |

(Continued)

FOREIGN PATENT DOCUMENTS

| EP | 0 175 632 A1 | 3/1986 |
| EP | 0 257 667 A1 | 3/1988 |

(Continued)

OTHER PUBLICATIONS

Machine translation of JP-06049783-A, published 1994. (Year: 1994).*

(Continued)

Primary Examiner — Brian W Cohen
(74) Attorney, Agent, or Firm — Foley & Lardner LLP

(57) ABSTRACT

A process for manufacturing an elongated steel element for reinforcing rubber products includes forming, on an elongated steel element, a coating of a ternary or quaternary alloy of copper-M-zinc, where M is one or two metals selected from cobalt, nickel, tin, indium, manganese, iron, bismuth and molybdenum; drawing the elongated steel element in an aqueous lubricant containing a phosphorus compound and nitrate; and twisting two or more of the elongated steel elements into a steel cord. A copper content inside the coating is 58 to 75 wt %. A content of the one or two metals inside the coating is 0.5 to 10 wt %. A final reduction in a diameter of the elongated steel element occurs during the drawing step. The phosphorus compound is present on and/or in the coating in an amount of 0.3 to 1 mg/m$^2$ of the coating, as measured via an Inductively Coupled Plasma technique.

19 Claims, No Drawings

(56) References Cited

U.S. PATENT DOCUMENTS

| | | | |
|---|---|---|---|
| 4,189,332 A | 2/1980 | Rye et al. |
| 4,255,496 A | 3/1981 | Haemers |
| 4,265,678 A | 5/1981 | Hachisuka et al. |
| 4,269,645 A | 5/1981 | Shemenski, Sr. |
| 4,269,877 A | 5/1981 | Shemenski, Sr. |
| 4,283,460 A | 8/1981 | Shemenski, Sr. |
| 4,347,290 A | 8/1982 | Haemers |
| 4,446,198 A | 5/1984 | Shemenski et al. |
| 4,488,587 A | 12/1984 | Umezawa et al. |
| 4,521,558 A | 6/1985 | Mowdood |
| 4,543,298 A | 9/1985 | Riedl |
| 4,545,834 A | 10/1985 | Shemenski et al. |
| 4,572,264 A | 2/1986 | Umezawa et al. |
| 4,651,513 A | 3/1987 | Dambre |
| 4,704,337 A | 11/1987 | Coppens et al. |
| 4,765,917 A | 8/1988 | Otaki et al. |
| 4,788,815 A | 12/1988 | Umezawa |
| 4,883,722 A | 11/1989 | Coppens et al. |
| 5,050,657 A | 9/1991 | Umezawa |
| 5,118,367 A | 6/1992 | Starinshak |
| 5,321,941 A | 6/1994 | Bollen et al. |
| 5,323,596 A | 6/1994 | Nguyen |
| 5,498,351 A | 3/1996 | Hefling |
| 5,526,864 A | 6/1996 | Kuriya et al. |
| 5,687,557 A | 11/1997 | De Vos et al. |
| 5,697,204 A | 12/1997 | Kuriya |
| 5,843,583 A | 12/1998 | D'Haene et al. |
| 5,878,564 A | 3/1999 | De Vos et al. |
| 6,068,918 A | 5/2000 | Van Der Veer et al. |
| 6,150,308 A | 11/2000 | Deruyck et al. |
| 6,203,932 B1 | 3/2001 | Hisakatu |
| 6,691,758 B2 | 2/2004 | Kim et al. |
| 6,811,877 B2 | 11/2004 | Haislet et al. |
| 6,863,103 B1 | 3/2005 | Masubuchi et al. |
| 7,089,723 B2 | 8/2006 | Vanneste et al. |
| 7,152,391 B2 | 12/2006 | Vanneste et al. |
| 7,162,902 B2 | 1/2007 | Oosawa et al. |
| 7,300,685 B2 | 11/2007 | Acx |
| 7,963,093 B2 | 6/2011 | Vanderbeken et al. |
| 8,863,490 B2 | 10/2014 | Boisseau et al. |
| 8,899,007 B2 | 12/2014 | Cheng et al. |
| 2002/0103089 A1 | 8/2002 | Fukushima et al. |
| 2005/0051251 A1 | 3/2005 | Sinopoli et al. |
| 2006/0237110 A1 | 10/2006 | Barguet et al. |
| 2010/0170215 A1 | 7/2010 | Nishimura |
| 2012/0177944 A1 | 7/2012 | Toyosawa |
| 2014/0196810 A1 | 7/2014 | Glejbol et al. |
| 2014/0378597 A1 | 12/2014 | Buytaert et al. |
| 2015/0017467 A1 | 1/2015 | Buytaert et al. |

FOREIGN PATENT DOCUMENTS

| | | | | |
|---|---|---|---|---|
| EP | 0 314 230 A1 | 5/1989 | | |
| EP | 0 382 273 A1 | 8/1990 | | |
| EP | 1 067 236 A2 | 1/2001 | | |
| EP | 2 268 839 | 9/2009 | | |
| GB | 1 466 114 A | 3/1977 | | |
| GB | 2 076 320 A | 12/1981 | | |
| JP | 55-071887 A | 5/1980 | | |
| JP | 56-082604 A | 7/1981 | | |
| JP | 56-096977 A | 8/1981 | | |
| JP | 62-288634 A | 12/1987 | | |
| JP | 01-113232 A | 5/1989 | | |
| JP | 01-113234 A | 5/1989 | | |
| JP | 01-295842 A | 11/1989 | | |
| JP | 02-036241 A | 2/1990 | | |
| JP | 06-049783 A | 2/1994 | | |
| JP | 06049783 A | * 2/1994 | .......... | D07B 1/0666 |
| JP | 2001-234371 A | 8/2001 | | |
| JP | 2003301391 A | * 10/2003 | .......... | D07B 1/0666 |
| JP | 2005-246447 A | 9/2005 | | |
| JP | 2006-028651 A | 2/2006 | | |
| JP | 2010-280928 A | 12/2010 | | |
| JP | 2011-147994 A | 8/2011 | | |
| JP | 2011-219837 A | 11/2011 | | |
| JP | 2012-012625 A | 1/2012 | | |
| WO | WO-2011/076746 A1 | 6/2011 | | |

OTHER PUBLICATIONS

Machine translation of JP-2003301391-A. (Year: 2003).*
U.S. Appl. No. 14/375,295, filed Jul. 29, 2014, Buytaert et al.
U.S. Appl. No. 14/375,567, filed Jul. 30, 2014, Buytaert et al.
Annonymous: "Micro-alloyed steel cord constructions for tyres", Mason Publications, vol. 349, No. 84, (May 1, 1993) 25 pgs.
Anonymous, High Durable Steel Cord Reinforced Rubber Tire, Research Disclosure, vol. 274, No. 36, Feb. 1, 1987, 2 pages, Mason Publications, Hampshire, GB.
Japanese Office Action and English translation, Application No. 2015-523462, Aug. 4, 2017, 12 pages.
Letter of Douglas Holtz of Jul. 16, 2015 (2 pages).
Sébastien Hollinger et al., Wear Mechanism of Tungsten carbide dies during wet drawing of Steel Tyre Cords, Wear, vol. 255, No. 7-12, Aug. 1, 2003, pp. 1291-1299.
USPTO Advisory Action, U.S. Appl. No. 14/375,295, dated Dec. 6, 2017, 9 pages.
USPTO Notice of Allowance, U.S. Appl. No. 14/416,769, dated Dec. 18, 2017, 9 pages.
USPTO Office Action, U.S. Appl. No. 14/375,295, dated Jan. 18, 2018, 29 pages.
USPTO Office Action, U.S. Appl. No. 14/375,295, dated Feb. 23, 2017, 9 pages.
USPTO Office Action, U.S. Appl. No. 14/375,295, dated May 30, 2017, 21 pages.
USPTO Office Action, U.S. Appl. No. 14/375,295, dated Sep. 19, 2017, 20 pages.
USPTO Office Action, U.S. Appl. No. 14/375,567, dated Mar. 9, 2017, 10 pages.
USPTO Office Action, U.S. Appl. No. 14/375,567, dated Sep. 19, 2017, 10 pages.
USPTO Office Action, U.S. Appl. No. 14/375,567, dated Dec. 27, 2017, 13 pages.
USPTO Office Action, U.S. Appl. No. 14/375,567, dated Jun. 1, 2017, 29 pages.
USPTO Office Action, U.S. Appl. No. 14/416,769, dated May 19, 2017, 16 pages.
USPTO Office Action, U.S. Appl. No. 14/416,769, dated Sep. 28, 2017, 12 pages.
W. J. Van Ooij, Mechanism and Theories of Rubber Adhesion To Steel Tire Cords—An Overview, Rubber Chemistry and Technology, Jan. 1, 1984, pp. 421-456, vol. 57.
USPTO Office Action, U.S. Appl. No. 14/375,567, dated Apr. 23, 2018, 23 pages.
Amendment and Reply Under 37 C.F.R. 1.116 in U.S. Appl. No. 14/375,295, dated Nov. 20, 2017, 12 pages.
USPTO Office Action, U.S. Appl. No. 14/375,567, dated Jul. 30, 2018, 29 pages.
USPTO Notice of Allowance, U.S. Appl. No. 14/375,567, dated Mar. 11, 2019, 8 pages.

* cited by examiner

PROCESS FOR MANUFACTURING AN ELONGATED STEEL ELEMENT TO REINFORCE RUBBER PRODUCTS

CROSS-REFERENCE TO RELATED APPLICATIONS

This application claims the benefit of and priority to U.S. patent application Ser. No. 14/375,295 filed on Jul. 29, 2014, which is a U.S. national stage entry of PCT/EP2012/064475 filed on Jul. 24, 2012, which claims the benefit of and priority to European Patent Application No. 12154051.2 filed on Feb. 6, 2012, the entire disclosures of which are incorporated by reference herein.

DESCRIPTION

Technical Field

The present invention relates to an elongated steel element adapted for the reinforcement of rubber products. The present invention also relates to a process for manufacturing such an elongated steel element.

Background Art

Elongated steel elements such as brass coated steel wires and steel cords are widely used to reinforce rubber products such as tires. In order to have a good adhesion formation and to reduce the rate of degradation of adhesion, particularly due to ageing in hot humid conditions, cobalt complexes are added to the rubber compound. However, cobalt is considered to be a poison for the rubber since, like most transition metals, it is an oxidation catalyst. As a result, oxidation of diene rubber molecules will be accelerated due to the presence of cobalt, which leads to earlier rubber ageing.

Moreover, cobalt also speeds up crack growth rate of the rubber.

In addition to the above disadvantage there is also the following problem: Cobalt is a strategic material and it is quite expensive. By adding cobalt to the whole rubber compound, one adds too much cobalt since it has only a positive function at the brass surface. Generally, it is considered that only 20% of the cobalt added to the rubber is used effectively.

The prior art has already recognized one or more of these problems. A lot of attempts have been made to concentrate the cobalt there where it belongs, namely in or on the coating of the steel wires or steel cords.

Yet in 1936 there was an attempt to completely replace the brass coating by a pure cobalt coating on articles for reinforcing rubber (U.S. Pat. No. 2,240,805).

U.S. Pat. No. 4,255,496 (Bekaert) discloses the use of a ternary alloy copper-cobalt-zinc coating instead of a binary alloy copper-zinc (=brass) coating. With this ternary alloy, the rate of bond degradation due to aging in hot humid conditions can be significantly reduced.

U.S. Pat. No. 4,265,678 (Tokyo Rope) teaches the use of a ternary alloy copper-zinc-cobalt coating with excellent drawability and adhesion properties.

GB-A-2 076 320 (Societal) teaches a thin layer of cobalt on top of a brass coating followed by a wire drawing so that there is a high gradient of cobalt on top of the brass coating.

EP-A1-0 175 632 (Goodyear) teaches a quaternary alloy coating copper-zinc-nickel-cobalt on steel elements.

Finally, WO-A1-2011/076746 discloses a steel cord with a ternary or quaternary alloy coating and with a zinc gradient. Although giving improvement with respect to adhesion, this zinc gradient involves a post-treatment of the wire or cord, meaning an extra operation step in the process.

DISCLOSURE OF INVENTION

It is an object of the present invention to avoid the drawbacks of the prior art.

It is also an object of the present invention to stir the adhesion performance of ternary alloy and quaternary alloy coated elongated steel elements.

It is yet another object of the present invention to avoid from using extra operation steps in the manufacturing process.

According to a first aspect of the present invention, there is provided an elongated steel element adapted for the reinforcement of rubber products. This elongated steel element is covered with a ternary alloy or quaternary alloy of a copper-M-zinc coating.

M is one or two metals selected from the group consisting of cobalt, nickel, tin, indium, manganese, iron, bismuth and molybdenum.

The copper content inside this coating ranges from 58 weight percent to 75 weight percent, e.g. from 61 wt % to 70 wt %.

The content of the one or two metals inside the coating ranges from 0.5 weight percent to 10 weight percent, e.g. 2 wt % to 8 wt %. The one or two metals are present throughout the coating, and not only present at the immediate surface.

The remainder is zinc and unavoidable impurities, e.g. impurities in quantities lower than 0.1 wt %.

The thickness of the coating ranges from 0.05 μm to 0.50 μm, e.g. from 0.12 μm to 0.40 μm.

The weight percentages of copper, the one or two metals and the balance of zinc may be measured by an analytical dissolution technique and with X-ray fluorescence (XRFS), Inductively Coupled Plasma (ICP), Inductively Coupled Plasma Optical Emission Spectrometry (ICP-OES) or Atomic Absorption Spectroscopy (AAS). These measurements are also suitable to obtain the coating weight and the coating thickness.

Phosphorus is present on or in the coating in an amount ranging from 0.3 milligram per square meter to 1 milligram per square meter of the coating, e.g. less than 0.99 mg/m$^2$, e.g. less than 0.95 mg/m$^2$. Examples of under limits are 0.4 mg/m$^2$ and 0.5 mg/m$^2$. This phosphorus amount may be present in the form of phosphates. The phosphorus amount may be measured by means of an Inductively Coupled Plasma technique or by an ultraviolet-visible spectroscopy.

The coating or the surface of the coating is further lacking residues of compounds that complex with the copper in the coating to form an insoluble film. These compounds include triazoles, imidazoles and indazoles. Such compounds include those having the following structural formula:

$$\begin{array}{c} -C-A=B \\ \parallel \quad \quad | \\ -C \quad \quad N \\ \quad \quad \quad H \end{array}$$

where the adjacent carbon atoms are joined to form a benzene or naphthylene ring, said ring being substituted or unsubstituted and wherein A and B are selected from a group consisting of —N— or —CH—, with A and B never being simultaneously equal to —CH—. Examples of such compounds are benzotriazole, tolyltriazole, benzimidazole, indazole, naphthatriazole.

The absence of these residues may be measured by a Time of Flight-Secondary Ion Mass Spectrometry (ToF-SIMS) technique. This technique provides information on the atomic and molecular composition of the uppermost 1-3 monolayers with sensitivities at ppm level and lateral resolutions down to 100 nm.

ToF-SIMS is not an inherently quantitative technique because the detected intensities depend on the chemical composition of the ambient material ("matrix effect"). Semi-quantitative information can be obtained if the chemical environment of the samples to be compared is similar.

In spectrometry mode a total mass spectrum of a surface region of interest is acquired. These spectra are usually recorded with high mass resolution and a low number of used primary ions. The high mass resolution is necessary for a reliable identification of secondary ion signals and corresponding sum formulas. The limited number of primary ions guarantees that the detected signals are representative for the original chemical composition of the sample surface (Static SIMS limit).

For the ToF-SIMS measurements of the present invention, an ION-TOF "TOF-SIMS IV" SIMS instrument was used. Ion bombardment of the surface was performed using bismuth ions at 25 keV in a bunched mode. Analysis current is 0.2 pA and the analysed area is $100 \times 100$ $\mu m^2$.

The elongated steel element may be a steel wire or a steel cord. In case of a steel cord, the invention is not limited to a particular type of construction.

The terms "adapted for the reinforcement of rubber products" refer to steel wires and steel cords with a suitable wire or filament diameter, a suitable steel composition and a suitable tensile strength.

A suitable steel composition is e.g. a minimum carbon content of 0.65%, a manganese content ranging from 0.10% to 0.70%, a silicon content ranging from 0.05% to 0.50%, a maximum sulphur content of 0.03%, a maximum phosphorus content of 0.03% and even 0.02%, all percentages being percentages by weight. There are only traces of copper, nickel and/or chromium. The remainder is always iron.

Micro-alloyed steel compositions may also be suitable such as compositions further comprising one or more of following elements:

chromium (% Cr): in amounts ranging from 0.10% to 1.0%, e.g. from 0.10 to 0.50%;
nickel (% Ni): in amounts ranging from 0.05% to 2.0%, e.g. from 0.10% to 0.60%;
cobalt (% Co): in amounts ranging from 0.05% to 3.0%; e.g. from 0.10% to 0.60%;
vanadium (% V): in amounts ranging from 0.05% to 1.0%, e.g. from 0.05% to 0.30%;
molybdenum (% Mo): in amounts ranging from 0.05% to 0.60%, e.g. from 0.10% to 0.30%;
copper (% Cu): in amounts ranging from 0.10% to 0.40%, e.g. from 0.15% to 0.30%;
boron (% B): in amounts ranging from 0.001% to 0.010%, e.g. from 0.002% to 0.006%;
niobium (% Nb): in amounts ranging from 0.001% to 0.50%, e.g. from 0.02% to 0.05%;
titanium (% Ti): in amounts ranging from 0.001% to 0.50%, e.g. from 0.001% to 0.010%;
antimony (% Sb): in amounts ranging from 0.0005% to 0.08%, e.g. from 0.0005% to 0.05%;
calcium (% Ca): in amounts ranging from 0.001% to 0.05%, e.g. from 0.0001% to 0.01%;
tungsten (% W): e.g. in an amount of about 0.20%;
zirconium (% Zr): e.g. in an amount ranging from 0.01% to 0.10%;
aluminum (% Al): preferably in amounts lower than 0.035%, e.g. lower than 0.015%, e.g. lower than 0.005%;
nitrogen (% N): in amounts less than 0.005%;
rare earth metals (% REM): in amounts ranging from 0.010% to 0.050%.

Within the context of the present invention low-carbon steel compositions such as disclosed in EP-A-2 268 839 are not excluded. Such a steel composition has a carbon content of less than 0.20%. An example is a carbon content ranging between 0.04% and 0.08%, a silicon content of 0.166%, a chromium content of 0.042%, a copper content of 0.173%, a manganese content of 0.382%, a molybdenum content of 0.013%, a nitrogen content of 0.006%, a nickel content of 0.077%, a phosphorus content of 0.007%, a sulphur content of 0.013%, all percentages being percentages by weight.

The diameter of individual steel wires or steel filaments of elongated steel elements adapted for reinforcement of rubber products usually ranges from 0.03 mm to 1.20 mm, e.g. from 0.10 mm to 0.80 mm, e.g. from 0.15 mm to 0.60 mm.

The levels of roughness $R_a$ measured on the individual steel wires vary from 0.10 µm to 2.0 µm, e.g. from 0.10 µm to 1.0 µm, e.g. from 0.10 µm to 0.30 µm.

The tensile strength of elongated steel elements adapted for the reinforcement of rubber products largely depends upon the diameter and usually ranges from 1500 MPa to 4500 MPa, e.g. from 2000 MPa to 4000 MPa.

As will be explained hereinafter, the small amounts of phosphorus on the coating together with the absence of triazole residues lead to improved adhesion results at under cure, i.e. when the rubber is vulcanised for about half of the regular curing time. Below 0.3 $mg/m^2$ little or no effect is being noticed. As the results will show, with amounts of phosphorus above 1 $mg/m^2$, lower adhesion performance in under cure is noticed.

EP-A1-0 257 667 discloses a brass alloy coating for steel elements for rubber reinforcement, where the brass alloy coating contains small amounts of phosphorus. The phosphorus is described as improving the adhesion between the rubber and the brass. However, the amount of phosphorus is higher than in the present invention.

According to a second aspect of the present invention, there is provided process for manufacturing an elongated steel element. This process comprising the following steps:

a) coating an elongated steel element with a ternary alloy or quaternary alloy of copper-M-zinc coating, M being one or two metals selected from the group consisting of cobalt, nickel, tin, indium, manganese, iron, bismuth and molybdenum, the copper content inside the coating ranges from 58 weight percent to 75 weight percent, the content of the one or two metals inside the coating ranges from 0.5 weight percent to 10 weight percent, the remainder is zinc and unavoidable impurities, the one or two metals being present throughout said coating;

b) drawing the thus coated elongated steel element in an aqueous lubricant containing a phosphorus compound, the amount of phosphorus compound being such that phosphorus is present on the coating in an amount of less than 1 milligram per square meter of the coating. The phosphorus amount is measured by means of an Inductively Coupled Plasma technique. The lubricant further lacks compounds that complex with the copper in the coating to form an insoluble film.

The process also lacks other steps of treating the elongated steel element with such compounds.

The lubricant may be an emulsion or a dispersion.

The thus drawn elongated steel elements may be twisted by means of a double-twister, or by means of a tubular twisting machine.

As mentioned, the relatively small amounts of phosphorus lead to an improved adhesion behaviour in under cure. Since the phosphorus is added to the ternary alloy or quaternary alloy coating by means of the wet wire drawing lubricant, no additional process step is required to achieve this improved adhesion.

The invention also relates to a rubber product reinforced with an elongated steel element with the features as disclosed hereabove.

MODE(S) FOR CARRYING OUT THE INVENTION

Two sample steel wires with a diameter of 1.98 mm are provided with a ternary alloy coating as follows:

i) pickling in a $H_2SO_4$ solution to clean the surface of the steel wire;

ii) electroplating with copper from a $Cu_2P_2O_7$ solution; solution contains 25 g/l copper and 180 g/l pyrophosphate; current density is 8.6 A/dm$^2$ or higher for a higher copper content;

iii) electroplating cobalt from a $CoSO_4$ solution; solution contains 40 g/l cobalt and current density is 22 A/dm$^2$;

iv) electroplating with zinc from a $ZnSO_4$ solution; solution contains 50 g/l zinc and current density is 8.8 A/dm$^2$ or lower for a lower zinc content;

v) applying a thermal diffusion process to create the ternary alloy Cu—Co—Zn;

vi) removing excess of ZnO formed during diffusion process via a dip in an acid;

vii) rinsing and drying.

Steel wire 1 has following coating composition: 63.5 wt % Cu, 4.0 wt % Co, the remainder being Zn.

Steel wire 2 has following coating composition: 67.0 wt % Cu, 4.0 wt % Co, the remainder being Zn.

The steel wires are subjected to a final reduction in diameter during a wet wire drawing operation.

Three different lubricants are used: I-X-Y.

Lubricant I is the lubricant to be used in the context of the present invention. Lubricant I is an aqueous emulsion containing more than 90% water, an oil, surfactant, soap, phosphorus compound and a pH buffering system. The pH is also partially buffered by working of amines.

More particularly, lubricant I comprises phosphates, sulphates, nitrates, O-containing hydrocarbons and fatty acid residues, N-containing hydrocarbons. The phosphates may be present as $PO_2^-$ or as $PO_3^-$ ions.

Reference lubricant X is an aqueous emulsion containing more than 90% water, mineral oil, surfactant, soap, phosphorus compound, extreme pressure additive, corrosion inhibitor of the triazole type, e.g. benzotriazole, and a pH buffering system. The pH is also partially buffered by working of amines.

More particularly, lubricant X contains phosphates, CN/CNO, benzotriazole, hydrocarbons, fatty acids and octylphosphate acid.

Reference lubricant Y is an aqueous emulsion containing more than 90% water, vegetable oil, surfactant, soap, phosphorus compound, extreme pressure additive, corrosion inhibitor of the triazole type, e.g. benzotriazole, and a pH buffering system. The pH is also partially buffered by working of amines.

More particularly, lubricant Y contains phosphates, CN/CNO, benzotriazole, hydrocarbons, fatty acids and octylphosphate acid.

Final steel wire diameter is 0.30 mm. After wet wire drawing the steel wires have been twisted into a 2×0.30 steel cord construction.

Combining the two steel wires 1 and 2 with the three lubricants I, X and Y, gives six different steel cord samples 1-I, 1-X, 1-Y, 2-I, 2-X and 2-Y. These six different steel samples have been vulcanized in a rubber compound. The pull-out force (POF) and the appearance ratio (APR) or rubber coverage have been measured on these samples.

Table 1 lists, amongst others, the amount of phosphorus on the surface of the ternary alloy coating.

TABLE 1

| Sample | Lube | Cu (wt %) | Co (wt %) | Thickness coating (μm) | $P_s$ (mg/m$^2$) |
|---|---|---|---|---|---|
| 1-I inv | I | 64.00 | 3.7 | 0.26 | 0.85 |
| 1-X ref | X | 64.50 | 3.6 | 0.25 | 1.15 |
| 1-Y ref | Y | 64.20 | 3.7 | 0.25 | 1.31 |
| 2-I inv | I | 67.60 | 3.5 | 0.26 | 0.75 |
| 2-X ref | X | 68.00 | 3.5 | 0.25 | 1.07 |
| 3-Y ref | Y | 68.13 | 3.5 | 0.25 | 1.24 |

Inv = invention
ref = reference
$P_s$ = amount of phosphorus

Table 2 mentions the results of the pull-out test and of the appearance ratio test in under cure.

TABLE 2

| Sample | Pull-out Force (N) | Appearence Ratio (%) |
|---|---|---|
| 1-I inv | 334 | 60 |
| 1-X ref | 263 | 48 |
| 1-Y ref | 223 | 33 |
| 2-I inv | 338 | 68 |
| 2-X ref | 279 | 60 |
| 3-Y ref | 255 | 50 |

The invention samples 1-I inv and 2-I-inv clearly perform better both in the pull-out test as in the appearance ratio test.

The adhesion behaviour of invention samples 1-I-inv and 2-I-inv at regular cure (RC) and after steam aging (SA) are at an acceptable high level, see Table 3 hereafter.

RC is the TC90 time plus 5 minutes and TC90 is the time when the rubber reaches 90% of its maximum torque on a rheometer curve taken at vulcanisation temperature.

SA is steam cooking RC samples at 120° C. for 1 or 2 days.

TABLE 3

| Sample | POF (RC) | POF (SA) | APR (RC) | APR (SA) |
|---|---|---|---|---|
| 1-I-inv | 421 | 359 | 85 | 83 |
| 2-I-inv | 379 | 256 | 80 | 58 |
| 3-I-ref | 377 | 142 | 80 | 28 |
| 3-X-ref | 387 | 197 | 78 | 43 |
| 3-Y-ref | 403 | 227 | 83 | 45 |

3 refers to an elongated steel element with a more common brass coating copper-zinc.

3-I-ref was drawn in lubricant I and has 63.95 wt % Cu in its coating and 0.81 mg/m² phosphorus on or in its coating.

3-X-ref was drawn in lubricant X and has 64.30 wt % Cu in its coating and 1.09 mg/m² phosphorus on or in its coating.

3-Y-ref was drawn in lubricant Y and has 64.20 wt % Cu in its coating and 1.28 mg/m² phosphorus on or in its coating.

Table 4 hereunder summarizes the results of a ToF-SIMS analysis carried on steel cord sample 1-I-inv of the invention.

TABLE 4

| Ion | | Mass (u) | Position 1 | Position 2 |
|---|---|---|---|---|
| Elements | F | 19 | 3.32 | 3.57 |
| | S | 32 | 45.97 | 47.44 |
| | Cl | 35 | 239.10 | 361.63 |
| | Cu | 63 | 100.00 | 100.00 |
| | $CuH_2O_2$ | 97 | 441.02 | 470.14 |
| Phosphates, sulfates and nitrates | $PO_2$ | 63 | 158.69 | 643.35 |
| | $PO_3$ | 79 | 502.96 | 1551.88 |
| | $SO_2$ | 64 | 105.64 | 118.68 |
| | $SO_3$ | 80 | 219.20 | 222.74 |
| | $NO_3$ | 46 | 111.52 | 263.07 |
| | $NO_2$ | 62 | 79.42 | 164.11 |
| O-containing hydrocarbons and fatty acid residues | $C_2H_2O_2$ | 58 | 120.42 | 183.53 |
| | $C_3H_3O_2$ | 71 | 176.96 | 275.66 |
| | $C_{16}H_{31}O_2$ | 255 | 13.25 | 33.91 |
| | $C_{18}H_{33}O_2$ | 281 | 4.75 | 9.70 |
| | $C_{18}H_{35}O_2$ | 283 | 12.23 | 42.70 |
| N-containing hydrocarbons | CN | 26 | 576.57 | 732.98 |
| | CNO | 42 | 311.18 | 426.13 |
| Triazole | $C_6H_4N$ | 90 | 2.58 | 3.81 |
| | $C_6H_4N_3$ | 118 | 1.75 | 2.66 |

According to the present invention, the elongated steel elements lack triazoles on the coating, so they also lack benzotriazoles. Table 4, however, mentions some values for triazoles. However, these values are to be considered as "noise level". Values higher than 5, e.g. higher than 10 are to be considered as above noise level.

The same is valid for imidazoles and for indazoles: explicit measuring these compounds by means of the ToF-SIMS technique would deliver noise values.

Table 5 hereunder mentions two possible tire rubber compound formulations together with its properties where an effective improvement on UC adhesion has been noticed.

TABLE 5

| Ingredient | Compound 1 | Compound 2 |
|---|---|---|
| Natural rubber TSR10 | 100 parts | 100 parts |
| ZnO - Zinc oxide | 9 phr | 9 phr |
| Stearic acid | — | 0.7 phr |
| Carbon black HAFLS N326 | 65 phr | 65 phr |
| Anti-degradation compound 6PPD (*) | 1.8 phr | 1.8 phr |
| Sulphur source Crystex HSOT20 | 6.4 phr | 6.4 phr |
| Accelerator DCBS | 0.8 phr | — |
| Cobalt salt Manobond 680C | 0.27 phr | — |
| Accelerator TBBS | — | 0.7 phr |
| Retarder PVI | — | 0.25 phr |
| Properties Rheometer Cure at 150° C. | | |
| Tc2 (min) | 1.8 | 3.5 |
| Tc90 (min) | 12.0 | 13.0 |
| $M_H$ (dNm) | 31.5 | 30.6 |

TABLE 5-continued

| Ingredient | Compound 1 | Compound 2 |
|---|---|---|
| Mooney at 100° C. | | |
| Viscosity (MU) | 66 | 70 |
| Shore A Hardness | 70 | 66 |
| Breaking load (N) | 336 | 337 |
| Tensile strength (MPa) | 22.5 | 23.0 |
| Modulus 100% (N/cm²) | 4.7 | 4.7 |
| Modulus 200% (N/cm²) | 10.3 | 11.1 |
| Modulus 300% (N/cm²) | 16.3 | 17.9 |
| Elongation at break (%) | 421 | 396 |
| DMTA at 60° C. 10 Hz dynamic strain | | |
| E' (MPa) | 12.61 | 8.58 |
| E" (MPa) | 1.98 | 0.94 |
| Tan δ (-) | 0.157 | 0.109 |

DMTA = dynamic mechanical thermal analysis the Tan δ at 60° C. is an indication of the rolling resistance, the higher the value, the higher the rolling resistance.

Next to the ternary alloy compositions mentioned in Table 1, following compositions have also been tested:

| % Cu | % Co |
|---|---|
| 67 | 4 |
| 67 | 2 |
| 63 | 4 |
| 70 | 2 |
| 70 | 4 |
| 67 | 6 |
| 63.5 | 8 |
| 63.5 | 1 |

Due to an improved adhesion performance and better rubber compound an increased tire endurance may be noticed.

In addition, the absence of cobalt in the rubber compound reduces the rubber heat ageing.

Finally a lower rolling resistance of about 2.5% to 4.0% or even more may be noticed.

What is claimed:

1. A process for manufacturing an elongated steel element configured to reinforce rubber products, the process comprising the following steps:
   a step of forming a coating on an elongated steel element, the coating comprising a ternary or quaternary alloy of copper-M-zinc, wherein
   M is one or two metals selected from the group consisting of cobalt, nickel, tin, indium, manganese, iron, bismuth and molybdenum,
   a copper content inside the coating ranges from 58 weight percent to 75 weight percent,
   a content of the one or two metals inside the coating ranges from 0.5 weight percent to 10 weight percent,
   a remainder is zinc and impurities, and
   the one or two metals are present throughout the coating;
   a step of drawing the elongated steel element having the coating formed thereon in an aqueous lubricant containing a phosphorus compound; and
   a step of twisting two or more of elongated steel elements into a steel cord performed after the step of drawing the elongated steel element having the coating formed thereon in the aqueous lubricant,
   wherein a final reduction in a diameter of the elongated steel element occurs during the step of drawing the elongated steel element having the coating formed thereon in the aqueous lubricant, the phosphorus compound being present on and/or in the coating in an amount ranging from 0.3 milligram per square meter to 1 milligram per square meter of the coating, as measured via an Inductively Coupled Plasma technique, the aqueous lubricant further comprising nitrate in an amount above a detection level of a ToF-SIMS technique,
wherein a level of roughness of the elongated steel element ranges from 0.30 µm to 2.0 µm.

2. The process of claim 1, wherein the copper content inside the coating ranges from 61 weight percent to 70 weight percent.

3. The process of claim 2, wherein the content of the one or two metals inside the coating ranges from 2 weight percent to 8 weight percent.

4. The process of claim 1, wherein the elongated steel element comprises a steel wire or a steel cord.

5. The process of claim 1, wherein a content of the impurities is lower than 0.1 weight percent.

6. The process of claim 1, wherein a thickness of the coating ranges from 0.05 µm to 0.50 µm.

7. The process of claim 1, wherein the coating does not include triazoles, imidazoles, or indazoles.

8. The process of claim 1, wherein a diameter of the elongated steel element ranges from 0.03 mm to 1.20 mm.

9. The process of claim 1, wherein a tensile strength of the elongated steel element ranges from 1500 MPa to 4500 MPa.

10. The process of claim 1, wherein the elongated steel element is not treated with triazoles, imidazoles, or indazoles.

11. The process of claim 1, wherein the aqueous lubricant comprises an aqueous emulsion containing more than 90% water, an oil, surfactant, soap, the phosphorous compound, and a pH buffer.

12. The process of claim 1, wherein the aqueous lubricant comprises phosphates, sulfates, nitrates, O-containing hydrocarbons and fatty acid residues, and N-containing hydrocarbons.

13. The process of claim 1, wherein the step of forming the coating on the elongated steel element comprises:
    electroplating the elongated steel element with a copper solution;
    electroplating the elongated steel element with a cobalt solution;
    electroplating the elongated steel element with a zinc solution; and
    applying a thermal diffusion process to create the ternary alloy comprising Cu—Co—Zn.

14. The process of claim 13, wherein the step of forming the coating on the elongated steel element comprises:
    electroplating the elongated steel element with a $Cu_2P_2O_7$ solution;
    electroplating the elongated steel element with a $CoSO_4$ solution;
    electroplating the elongated steel element with a $ZnSO_4$ solution; and
    applying a thermal diffusion process to create the ternary alloy comprising Cu—Co—Zn.

15. The process of claim 13, wherein
electroplating the elongated steel element with the copper solution comprises using a current density of 8.6 A/dm$^2$ or higher; and
electroplating the elongated steel element with the zinc solution comprises using a current density of 8.8 A/dm$^2$ or lower.

16. The process of claim 13, wherein the step of forming the coating on the elongated steel element further comprises cleaning a surface of the elongated steel element with a sulfuric acid solution prior to performing electroplating.

17. The process of claim 13, wherein the step of forming the coating on the elongated steel element further comprises removing excess ZnO formed during the thermal diffusion process by dipping the elongated steel element having the ternary alloy in an acid.

18. The process of claim 1, wherein drawing the elongated steel element having the coating formed thereon in the aqueous lubricant occurs in a single step.

19. A process for manufacturing an elongated steel element configured to reinforce rubber products, the process comprising the following steps:
    a step of forming a coating on an elongated steel element, the coating comprising a ternary or quaternary alloy of copper-M-zinc, wherein
        M is one or two metals selected from the group consisting of cobalt, nickel, tin, indium, manganese, iron, bismuth and molybdenum,
        a copper content inside the coating ranges from 58 weight percent to 75 weight percent,
        a content of the one or two metals inside the coating ranges from 0.5 weight percent to 10 weight percent,
        a remainder is zinc and impurities, and
        the one or two metals are present throughout the coating;
    a step of adding phosphorous on and/or in the coating in an amount ranging from 0.3 milligram per square meter to 1 milligram per square meter of the coating, as measured via an Inductively Coupled Plasma technique, the step of adding phosphorous consisting of drawing the elongated steel element having the coating formed thereon in an aqueous lubricant containing a phosphorus compound and nitrate in an amount above a detection level of a ToF-SIMS technique; and
    a step of twisting two or more of elongated steel elements into a steel cord performed after the step of adding phosphorous on and/or in the coating,
    wherein a level of roughness of the elongated steel element ranges from 0.30 µm to 2.0 µm.

* * * * *